United States Patent
Koziatek

(10) Patent No.: US 8,613,485 B2
(45) Date of Patent: *Dec. 24, 2013

(54) BICYCLE WHEEL RIM

(75) Inventor: Stanley F. Koziatek, Big Flats, NY (US)

(73) Assignee: K.G. Motors, Inc., Horseheads, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/219,340

(22) Filed: Aug. 26, 2011

(65) Prior Publication Data

US 2012/0049609 A1   Mar. 1, 2012

Related U.S. Application Data

(63) Continuation of application No. 12/420,595, filed on Apr. 8, 2009, now Pat. No. 8,007,053, which is a continuation of application No. 12/197,901, filed on Aug. 25, 2008, now abandoned, which is a continuation of application No. 11/965,153, filed on Dec. 27, 2007, now abandoned, which is a continuation of application No. 10/959,743, filed on Oct. 6, 2004, now Pat. No. 7,334,846.

(51) Int. Cl.
  *B60B 21/02* (2006.01)
(52) U.S. Cl.
  USPC ............... 301/95.104; 301/95.106; 152/382
(58) Field of Classification Search
  USPC ............... 301/58, 95.101, 95.104–95.108; 152/382, 516, 520
  See application file for complete search history.

(56) References Cited

U.S. PATENT DOCUMENTS

| 1,194,177 | A | | 8/1916 | Henderson |
| 1,316,773 | A | | 9/1919 | Daigre |
| 1,551,445 | A | * | 8/1925 | Wagenhorst ............... 152/381.6 |
| 4,896,921 | A | | 1/1990 | Sato et al. |
| 6,089,672 | A | | 7/2000 | Chen |
| 6,155,651 | A | | 12/2000 | Mizata et al. |
| 6,183,047 | B1 | | 2/2001 | Kuhl |
| 6,237,662 | B1 | | 5/2001 | Thomasberg |
| 6,283,557 | B1 | | 9/2001 | Okajima et al. |
| 6,402,255 | B1 | | 6/2002 | Chen |
| 6,402,256 | B1 | * | 6/2002 | Mercat ..................... 301/95.104 |

(Continued)

OTHER PUBLICATIONS

International Organization for Standardization. "Bicycle tyres and rims—Part 2: Rims." 2nd edition (Dec. 1, 1996). (20 pgs).

(Continued)

*Primary Examiner* — Jason Bellinger
(74) *Attorney, Agent, or Firm* — Wilmer Cutler Pickering Hale and Dorr LLP

(57) ABSTRACT

A bicycle wheel rim having a circular base portion including a proximal surface and a distal surface, and a pair of integral sidewalls extending generally radially outward from an intersection region of the proximal surface and the distal surface. The distal surface of the rim has a central hump, a trough contiguous with the central hump extending axially outward from the hump, and a flat shelf immediately adjacent, contiguous with, and extending axially outward from the trough. Another embodiment of the invention is directed to a bicycle wheel including the embodied rim, a plurality a spokes engaged at respective ends thereof with the rim and a hub engaged with the plurality of spoke members at opposite ends thereof. Another embodiment of the invention is directed to a bicycle wheel assembly comprising the embodied wheel and a tube and/or tire mounted on the rim.

16 Claims, 4 Drawing Sheets

(56) References Cited

U.S. PATENT DOCUMENTS

| | | |
|---|---|---|
| 6,409,279 B1 | 6/2002 | Chen |
| 6,428,115 B1 * | 8/2002 | Chen .................. 301/95.106 |
| 6,457,501 B1 | 10/2002 | Ball |
| 6,568,766 B1 | 5/2003 | Okajima et al. |
| 6,736,462 B1 | 5/2004 | Okajima |
| 6,752,187 B1 * | 6/2004 | Tien ...................... 152/381.4 |
| 6,761,847 B2 | 7/2004 | Meggiolan |
| 6,767,069 B2 | 7/2004 | Chen |
| 6,767,070 B1 | 7/2004 | Chiang et al. |
| 6,776,460 B1 | 8/2004 | Lo |
| 6,817,680 B2 | 11/2004 | Chen |
| 6,938,962 B1 | 9/2005 | Schlanger |
| 7,083,239 B2 | 8/2006 | Okajima |
| 7,090,307 B2 | 8/2006 | Okajima |
| 7,104,300 B2 | 9/2006 | Veux et al. |
| 7,334,846 B2 * | 2/2008 | Koziatek ................. 301/95.104 |
| 8,007,053 B2 * | 8/2011 | Koziatek ................. 301/95.104 |
| 2003/0025383 A1 * | 2/2003 | LaCombe et al. ....... 301/95.101 |
| 2003/0150538 A1 | 8/2003 | Ceretta |
| 2004/0004391 A1 * | 1/2004 | Fioravanti .............. 301/95.104 |
| 2004/0095014 A1 | 5/2004 | Veux et al. |
| 2004/0222691 A1 | 11/2004 | Okajima |

OTHER PUBLICATIONS

International Organization for Standardization. "Bicycle tyres and rims—Part 1: Tyre designations and dimensions." 5th edition (Dec. 1, 1997). (14 pgs).

Inter Partes Reexamination Office Action Determination Under 37 CFR 41.77(d) mailed by the United States Patent and Trademark Office on Sep. 5, 2013 for Inter Partes Reexamination Control No. 95/001,125. (13pgs).

* cited by examiner

US 8,613,485 B2

BICYCLE WHEEL RIM

This application is a continuation of U.S. application Ser. No. 12/420,595, filed Apr. 8, 2009, now U.S. Pat. No. 8,007,053, which is a continuation of U.S. application Ser. No. 12/197,901, filed Aug. 25, 2008, abandoned, which is a continuation of U.S. application Ser. No. 11/965,153, filed Dec. 27, 2007, abandoned, which is a continuation of U.S. application Ser. No. 10/959,743, now U.S. Pat. No. 7,334,846, the entireties of which are incorporated herein by reference.

BACKGROUND OF THE INVENTION

1. Field of the Invention

Embodiments of the invention are directed to the field of bicycle wheel rims and, more particularly, to a lighter, stronger and otherwise improved rim for tires with or without tubes.

2. Description of Related Art

The rim is the outer, usually metal, hoop of a bicycle wheel. The spokes of a bicycle wheel extend between a central hub of the wheel and the rim. An inflatable tube and/or tire are positioned around the exterior of the rim and air is introduced through a valve mechanism to inflate the tube and/or tire on the rim as a functional part of a bicycle.

A prior art rim including a mounted, inflated tire is shown in cross section in FIG. 1 to illustrate conventional rim construction. The rim 100 has a base portion 101, which holds the distal portion of a spoke assembly 102. The base portion extends upward in the form of a Y to a point 103. A mounting surface 104 of the rim has a generally concave profile and extends between, and connects to, opposing points 103. Sidewalls 105 extend outwards from points 103 and terminate in bead lock region 106. Tire 110 has tire bead regions 112. In an uninflated state, the tire bead regions 112 loosely rest on rim surface 104 in the region between sidewalls 105. Upon inflation, the bead portions ride up the surface. 104 until they sealingly engage sidewalls 105. Due to the construction of the tire bead 112, the bead lock regions 106 help to stabilize the engagement of the tire with the rim. Many variations of rim designs are known to those skilled in the art. However, the great majority of rims will have the basic portions illustrated in FIG. 1.

The dimensions of various portions of a bicycle rim can significantly influence rim function. For example, weight is a significant consideration in a racing or touring rim. In addition to material considerations, rim parameters such as the inside distance between the rim sidewalls will largely determine useable tire size, the ability to use an inner tube within the tire, rim strength, the effect of forces on the rim during various maneuvers such as turning, braking, etc., and others. The shape of the surface 104 may significantly influence the ease of tube/tire mounting and tube/tire inflation. The height, shape and thickness of the rim sidewalls will contribute to overall rim weight, strength, tire stability, air leakage, and other considerations appreciated by those skilled in the art.

Several issues can be identified with respect to conventional rim construction and dimensions. Rim sidewalls typically have a height dimension, shown as H in FIG. 1, between about 0.225 inch to ≥0.265 inch for a conventional bicycle rim. As the dimension H increases, so does the mechanical leverage of the tire on the rim. The greater leverage resulting from a higher sidewall further increases the forces acting in the region of point 103 of the rim shown in FIG. 1, thus requiring additional support at points 103 in the form of more material and increased rim weight. A higher sidewall dimension, H, promotes greater flexing of the rim and may result in cracking or stress fracture of the rim material. In addition, as rim sidewall height, H, increases, available tire inflation volume decreases while inflation pressure increases. Moreover, less tire surface is available resulting in decreased traction and other disadvantages. Another consequence of high sidewalls and various head lock sizes and shapes is the well known "pinch flat" or "snake bite" that may be caused when the tube or tire gets pinched between the rim and a hard, sharp object such as a rock, curb stone or the edge of a pothole, for example. An under-inflated tire also contributes to a pinch flat occurrence. A too soft, or too narrow (for the rim) tire more easily lets the tire bottom out when striking an obstruction resulting in the pinch holes from the bead locks or distal portion of the sidewall.

Several issues to be considered with respect to rim surface 104 as shown in FIG. 1 include rim strength, the ability to uniformly position the tire bead region on the rim prior to inflation and the ease of tire inflation, particularly with a manual pump, the interchangeable use of tubes and/or tubeless tires, and others recognized in the art. In light of the known shortcomings of conventional bicycle rim designs, such as those set forth above and others known to those skilled in the art, the inventor has recognized a need for an improved rim that addresses these disadvantages and additionally results in a lighter, stronger, more versatile, better performing and cost effective rim for the rider.

SUMMARY OF THE INVENTION

An embodiment of the invention is directed to a bicycle wheel rim. The rim is intended to have an inner tube and/or a tire mounted onto the rim. The rim has a circular base portion consisting of a proximal surface (i.e., the surface facing the wheel hub, which as part of a wheel assembly engages a plurality of spoke members, the other ends of which are attached to the hub of the wheel assembly), and a distal surface (i.e., the radially outwardly facing surface with respect to the hub), which is the surface that engages the inner tube or the bead of a tire prior to inflation. The distal surface of the rim has a central hump, a trough contiguous with the central hump extending axially outward from the hump, and a flat shelf immediately adjacent, contiguous with, and extending axially outward from the trough. The rim further includes an integral sidewall extending generally radially outward from an intersection region of the proximal surface and the distal surface of the base portion of the rim. A distal point (i.e., farthest, free end) of the sidewall extends no further than 0.200 in above the shelf of the distal surface of the rim. It will be readily appreciated that the rim consists of two opposing sidewalls and that the distal surface of the base portion consists of a central hump, a trough on each axial side of the hump, and a flat shelf extending axially from each trough out to the intersection region with the proximal surface of the base portion. In an aspect, the distal point of the sidewall extends above the shelf in the range of between about 0.150 in to 0.195 in. In another aspect, the distal point of the sidewall extends only to between about 0.171 in to 0.175 in above the shelf. These dimensional ranges present a sidewall having a height, hereinafter denoted by H, that is on the order of 2 millimeters less than the sidewall height of a conventional bicycle wheel rim. A shorter sidewall as embodied herein not only results in a reduction in the weight of the rim, it also reduces the mechanical leverage that the tire has on the rim, making the rim stiffer and potentially longer lasting by eliminating flexing of the rim, which can lead to cracking. This feature also eliminates the need for corner reinforcement of the rim. Further advantages of a smaller sidewall height include less incidents of pinch flat compared to conventional rims, either with or without tubes, the ability to run lower air pressure in the tire based upon a larger available air volume, and approximately 4 mm more tire surface exposure for improved traction.

According to the embodiments of the invention, the inner profile of the sidewall has substantially the same profile shape as the bead of the tire. This produces a 'ball-and-socket' type fit that helps to reduce strain on the tire bead while creating a tighter air seal. The conventional bead lock at the distal end of the sidewall also has been eliminated. Thus, in an aspect, additional material can be used in the central part of the proximal surface of the rim for added strength and stiffness without increasing the overall weight of the rim.

The hump in the center of the distal surface of the rim is generally convex-shaped, forming an arch-type structure that adds additional strength to the rim. Alternatively, the hump may have a generally flat-top or other shape. The hump does not extend above the shelf of the distal surface as this would make tire mounting difficult. The troughs extending axially away from both sides of the hump provide separate channels for each tire bead. This feature greatly eases the effort of inflation as the separate channels make it easier to trap air. The hump also acts to keep the tire spread apart and allow for the valve stem to inject air directly into the center of the tire.

Another embodiment of the invention is directed to a bicycle wheel, including a rim as outlined above, a plurality of spokes engaged at respective ends thereof with the rim, and a hub engaged with the plurality of spoke members at opposite ends thereof.

Another embodiment of the invention is directed to a bicycle wheel assembly comprising a bicycle wheel as outlined herein above, and a tube and/or tire mounted on the rim.

The foregoing and other objects, features, and advantages of embodiments of the present invention will be apparent from the following detailed description of the preferred embodiments, which makes reference to several drawing figures.

DETAILED DESCRIPTION OF A PREFERRED EMBODIMENT OF THE INVENTION

Figure 1:
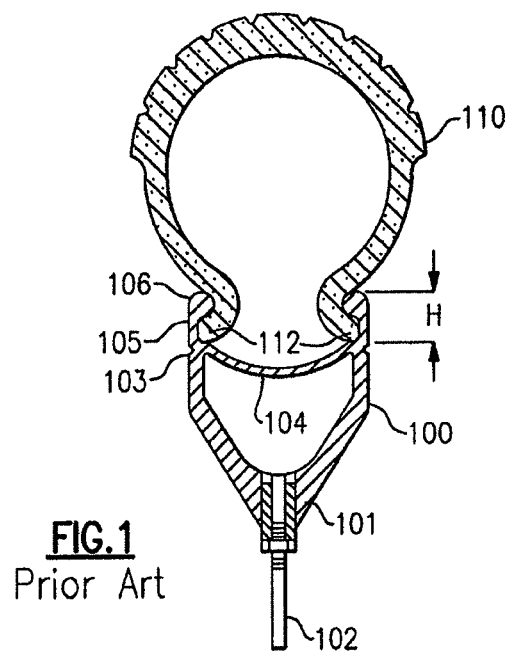
FIG. 1 is a cross sectional view of an exemplary bicycle wheel rim with an inflatable tire mounted thereon as known in the prior art.
Figure 2:
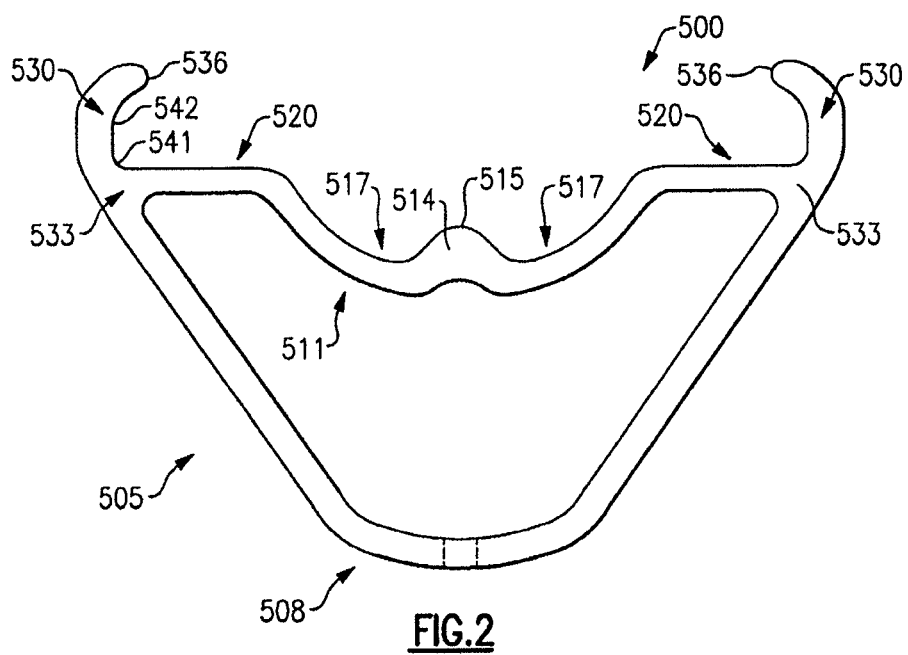
FIG. 2 is a cross sectional view of a bicycle wheel rim according to an embodiment of the invention.
Figure 3:
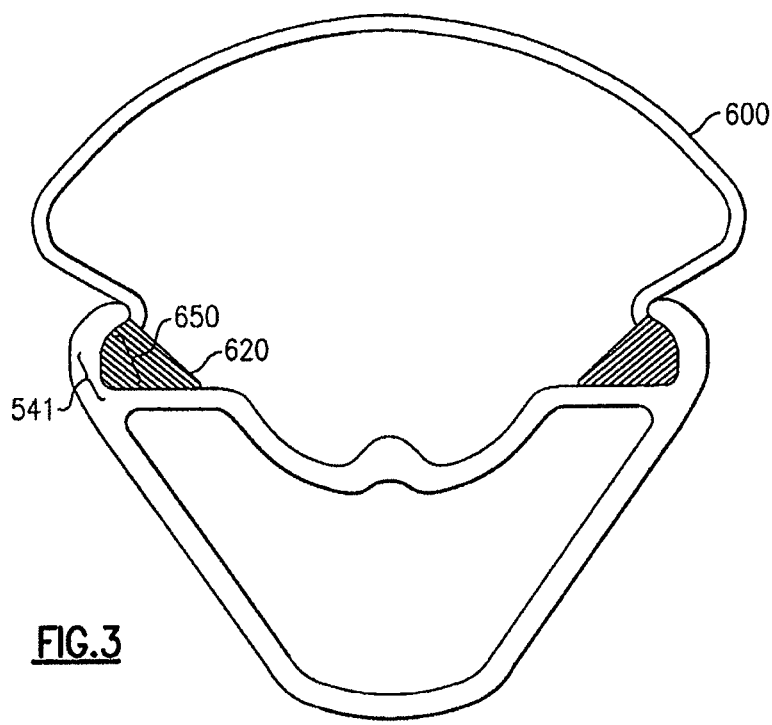
FIG. 3 is a figure identical to FIG. 2 with the addition of a mounted, inflated tire according to an embodiment of the invention.
Figure 4:
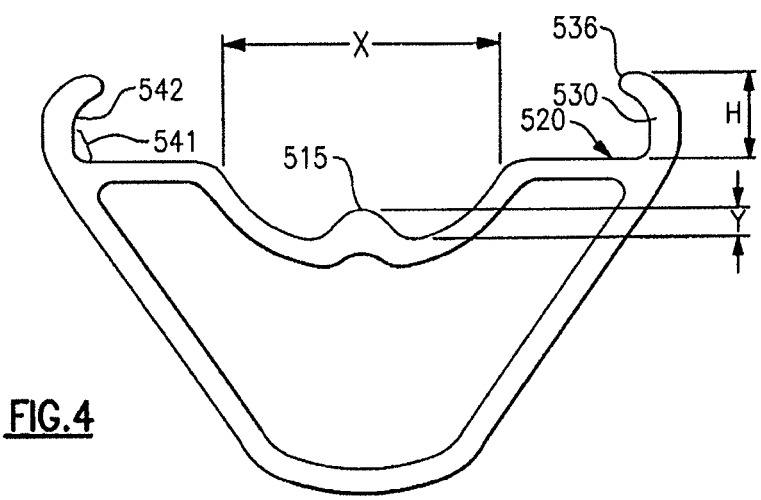
FIG. 4 is a view identical to that of FIG. 2 showing dimensional indicia according to an exemplary aspect of the invention.
Figure 8:
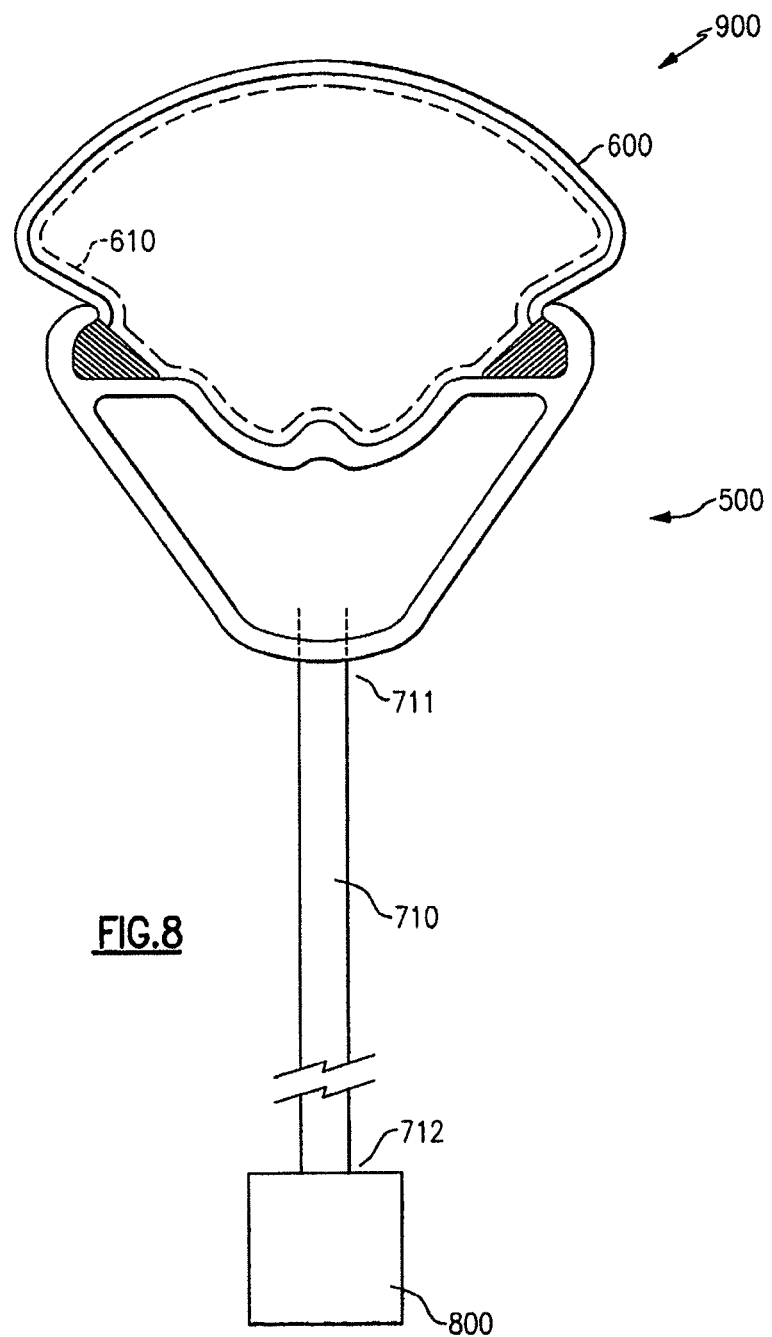
FIG. 8 is a cross sectional view of a bicycle wheel assembly according to an embodiment of the invention.

Reference is now made to FIG. 2, which shows a bicycle wheel rim 500 in cross sectional view according to an embodiment of the invention. According to embodiments of the invention, the rim 500 is adaptable for mounting a tubeless tire shown at 600 in FIG. 3 or a tire including an inner tube 610 as illustrated in FIG. 8. As shown in FIG. 1, the rim 500 has a circular base portion 505 having a proximal surface 508 that is engageable with a plurality of spokes 710 (see FIG. 8). The base portion also has a distal surface 511 in opposition to proximal surface 508 that, in part, supports the tube and/or tire. As shown in cross section, the distal surface 511 has a central hump 514, a trough 517 that is contiguous with the central hump, and a flat shelf 520 immediately adjacent and contiguous with the trough. The rim further has an integral sidewall 530 that extends generally radially upward from an intersecting region 533 of the proximal surface and the distal surface. In all embodiments set forth herein, the sidewall has a height, H, defined as the distance between the surface of the shelf 520 and a distal point 536 of the sidewall 530 that is less than or equal to 0.200 inches. FIG. 4 illustrates the sidewall height, H. The maximum sidewall height, H, is on the order of 2 mm less than the corresponding height of conventional rim sidewalls, which typically ranges between about 0.225 in to 0.265 in and above. The reduced sidewall height as embodied herein provides numerous advantages. For example, less of the tire sidewall is available to exert pressure against the rim sidewall; thus, there is less mechanical leverage exerted by the tire against the rim sidewall. This further results in less flexing of the sidewall particularly in the region designated at 533 in FIG. 2 where cracking and material fatigue may occur. Furthermore, approximately 4 mm more tire surface is available resulting in a larger air volume, the ability to run lower tire pressures, increased traction and reduced incidents of pinch flat or snake-bite puncture. In a particular aspect, the sidewall height, H, is between 0.150 in to 0.195 in. In an exemplary aspect, the sidewall height is between about 0.171 in to 0.175 in.

Figure 6:
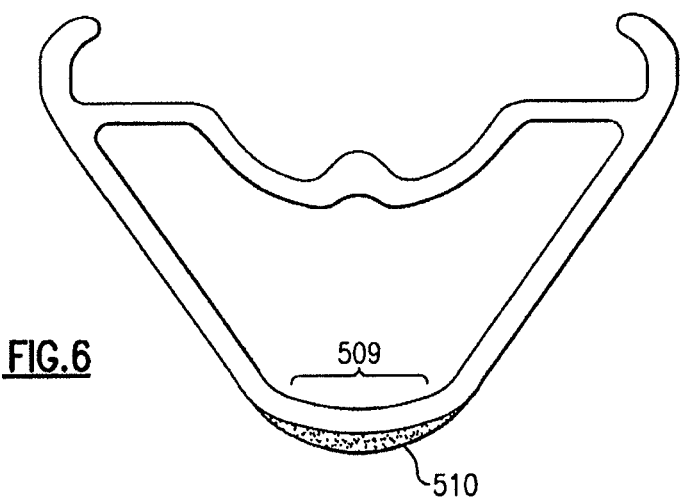
FIG. 6 is a cross sectional view of a bicycle wheel rim according to an exemplary aspect of the invention.

It will be noted that the distal end 536 of the sidewall 530 does not include a bead lock portion. This is due, in part, to a desirable aspect of the sidewall design; that is, the interior surface profile 542 of the sidewall has a region designated at 541 where the sidewall surface blends to the surface of the flat shelf, that substantially corresponds to a profile shape 650 of the tire bead 620 as illustrated in FIG. 3. This correspondingly similar shape of the sidewall interior surface 541 provides a "ball-and-socket" fit between the sidewall and the tire bead when the tire is fully inflated. The need for a bead lock is thus eliminated and as shown in the figures, the sidewall 530 does not have a bulbous shape at the distal end 536, as in the prior art of FIG. 1, so that a thickness of the sidewall 530 is not increased from where the sidewall 530 begins to extend inwardly to the distal end 536. Since weight reduction is always a goal of improved rim design, elimination of the bead lock eliminates the weight associated with them. In an aspect, illustrated in FIG. 6, the weight savings from the bead lock elimination can be redistributed to other regions of the rim for increased strength; for example, the central region 509 of the proximal surface of the rim can be thickened as shown at 510 without increasing the overall weight of the rim. In an exemplary embodiment, the bead seat 520 is disposed horizontally with respect to an axial direction of a rim. FIG. 8 shows such a configuration.

Figure 7:
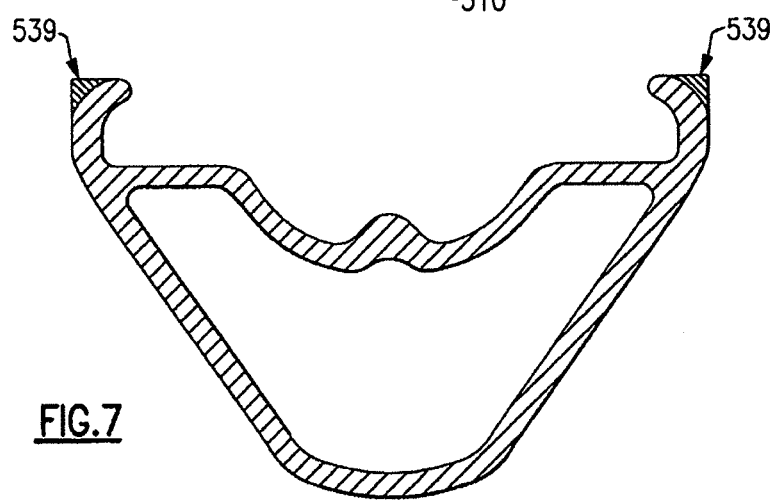
FIG. 7 is a cross sectional view of a bicycle wheel rim according to an exemplary aspect of the invention.

In still another aspect relating to sidewall design, the outer surface of the sidewall can be squared off, for example, as shown at 539 in FIG. 7.

Figure 5:
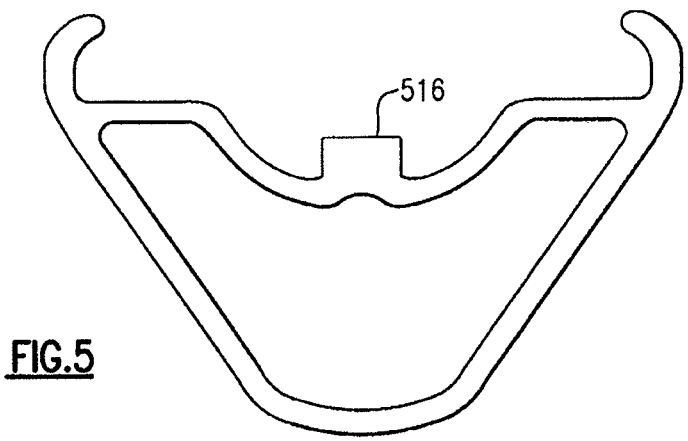
FIG. 5 is a cross sectional view of a bicycle wheel rim according to an exemplary aspect of the invention.

Referring again to FIG. 2, in the illustrated aspect, the distal surface 511 is smooth and continuous; i.e., it contains no acute inflection points between the shelves 520, the troughs 517 or the hump 514. As further illustrated, the hump has a substantially convex profile. This shape forms an arch structure along the center of the rim surface that contributes to the strength and stiffness of the rim. In an alternative aspect as illustrated in FIG. 5, the hump may be flat topped as shown at 516 or be otherwise shaped as those skilled in the art will appreciate. As shown in FIG. 4, a distal point 515 of the hump 514 extends a distance, Y, above the base of the trough 517. According to an aspect of the embodiment, the value, Y, is between about 0.054 in to 0.062 in. In an exemplary aspect, Y has a value of approximately 0.058 in.

It can be further observed in FIG. 2 that the troughs 517 on opposite axial sides of the hump 514 effectively form two channels. When a tire is initially mounted on the rim, each of the tire beads will sit in a respective trough region 517. Not only do the hump and troughs serve to keep the tire beads separated and confined prior to and during inflation, the separate channels created by the troughs make it easier to trap air and thus easier to inflate the tire particularly in the case of manual pumping. The hump and troughs also keep the tire spread apart and allow for the valve stem (not shown) to inject the air directly into the center of the tire, easing the inflation process. In an aspect as illustrated in FIG. 4, the overall trough distance, X, (alternatively, the separation distance between the shelf portions 520) is between about 0.300 in to 0.700 in. This range of separation distance, X, will accommodate various tire profiles. In a more particular aspect, X is between about 0.535 in to 0.549 in. In an exemplary aspect, X is approximately equal to 0.542 in.

According to another embodiment, illustrated with respect to FIG. 8, a bicycle wheel 900 includes a rim 500 as described above in all its various aspects, a plurality of spokes 710 engaged at respective ends 711 thereof with the rim and a hub 800 engaged with the plurality of spokes at opposite ends 712 thereof.

In another embodiment, a bicycle wheel assembly includes the wheel 900 as schematically illustrated in FIG. 8 and. further includes a tire 600 mounted on the wheel rim. In an aspect, a tube 610 may be used.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A bicycle wheel rim, comprising:
    a base portion including a proximal surface having a centrally positioned portion that is engageable with a spoke member and an opposing distal surface having flat bead seats engageable with a surface of a tire; and
    two opposing sidewalls extending from the base portion, wherein each of the sidewalls has an inner surface profile that matches a contour of a surface of the tire along the sidewall when the tire is engaged, further wherein the profiles respectively have an inner surface that extends inwardly and is curved at an intersection point of the flat bead seats with the two opposing sidewalls, wherein the bead seats are horizontally disposed with respect to an axial direction of the rim so that when the tire is mounted, beads of the tire are placed between the flat bead seats and the sidewalls to provide a socket fit, and wherein the sidewalls extend from intersections of the proximal surface and the distal surface, and wherein the point of each of the sidewalls most distal the flat bead seats respectively extends no further than 0.200 inches above the flat bead seats of the distal surface of the rim,
    a trough formed in the distal surface at a position intermediate the flat bead seats, the trough having a width between 0.300 and 0.700 inches; and
    the proximal surface including outer opposing walls that respectively extend from the centrally positioned portion that is engageable with the spoke member to intersections with the distal surface, the outer opposing walls being smooth and continuous so as to not contain any acute inflection points, wherein an open space is bound by the opposing walls so as to extend from one of the opposing walls to the other of the opposing walls, the open space curving along the trough.

2. The rim of claim 1, wherein the sidewalls have an outer surface facing in an outward direction of the rim and the outer surface has a contour that follows the contour of the inner surface profile.

3. The rim of claim 1, wherein the point of each of the sidewalls most distal the bead seats respectively extends from between 0.150 inches to 0.195 inches above the bead seats of the distal surface of the rim.

4. The rim of claim 3, wherein the point of each of the sidewalls most distal the bead seats respectively extends between 0.171 inches to 0.175 inches above the bead seats of the distal surface of the rim.

5. The rim of claim 1, wherein the distal surface of the rim has a central hump, such that the trough is contiguous with the central hump.

6. The rim of claim 5, wherein the hump has a substantially convex cross sectional profile.

7. The rim of claim 5, wherein the hump has a substantially arched cross sectional profile.

8. The rim of claim 5, wherein the hump has a substantially flat-topped cross sectional profile.

9. The rim of claim 1, wherein a central region of the proximal surface has a material thickness greater than the material thickness of a peripheral region of the proximal surface.

10. The rim of claim 1, wherein the bead seats are immediately adjacent and contiguous with the trough to the intersection point of the bead seats with the two opposing sidewalls.

11. The rim of claim 1, wherein the width of the trough is x, where 0.535 in<x<0.549 in.

12. A bicycle wheel, comprising:
    a plurality of spoke members engaged at respective ends thereof with a rim; and a hub engaged with the plurality of spoke members at opposite ends thereof, the rim comprising: a base portion including a proximal surface having a centrally positioned portion engageable with a spoke member and an opposing distal surface having flat bead seats engageable with a surface of a tire; and
    two opposing sidewalls extending from the base portion, wherein each of the sidewalls has an inner surface profile that matches a contour of a surface of the tire along the sidewall when the tire is engaged, further wherein the profiles respectively have an inner surface that extends inwardly and is curved at an intersection point of the flat bead seats with the two opposing sidewalls, wherein the bead seats are horizontally disposed with respect to an axial direction of the rim so that when the tire is mounted, beads of the tire are placed between the flat bead seats and the sidewalls to provide a socket fit, and wherein the sidewalls extend from intersections of the proximal surface and the distal surface, and wherein a point of each of the sidewalls most distal the flat bead seats respectively extends no further than 0.200 inches above the flat bead seats of the distal surface of the rim, a trough formed in the distal surface at a position intermediate the flat bead seats, the trough having a width between 0.300 and 0.700 inches; and the proximal surface including outer opposing walls that extend from the centrally positioned portion that is engagable with the spoke member to intersections with the distal surface, the outer opposing walls being smooth and continuous so as to not contain any acute inflection points, wherein an open space is bound by the opposing walls so as to extend from one of the opposing walls to the other of the opposing walls, the open space curving along the trough.

13. The bicycle wheel of claim 12, wherein the bead seats are immediately adjacent and contiguous with the trough to the intersection point of the bead seats with the two opposing sidewalls.

14. The bicycle wheel of claim 12, wherein the point of each of the sidewalls most distal the bead seats respectively extends from between 0.150 inches to 0.195 inches above the bead seats of the distal surface of the rim.

15. The bicycle wheel of claim 14, wherein the point of each of the sidewalls most distal the bead seats respectively extends between 0.171 inches to 0.175 inches above the bead seats of the distal surface of the rim.

16. The bicycle wheel of claim 12, wherein the bead seats are immediately adjacent and contiguous with the trough to the intersection point of the bead seats with the two opposing sidewalls.

\* \* \* \* \*